UNITED STATES PATENT OFFICE.

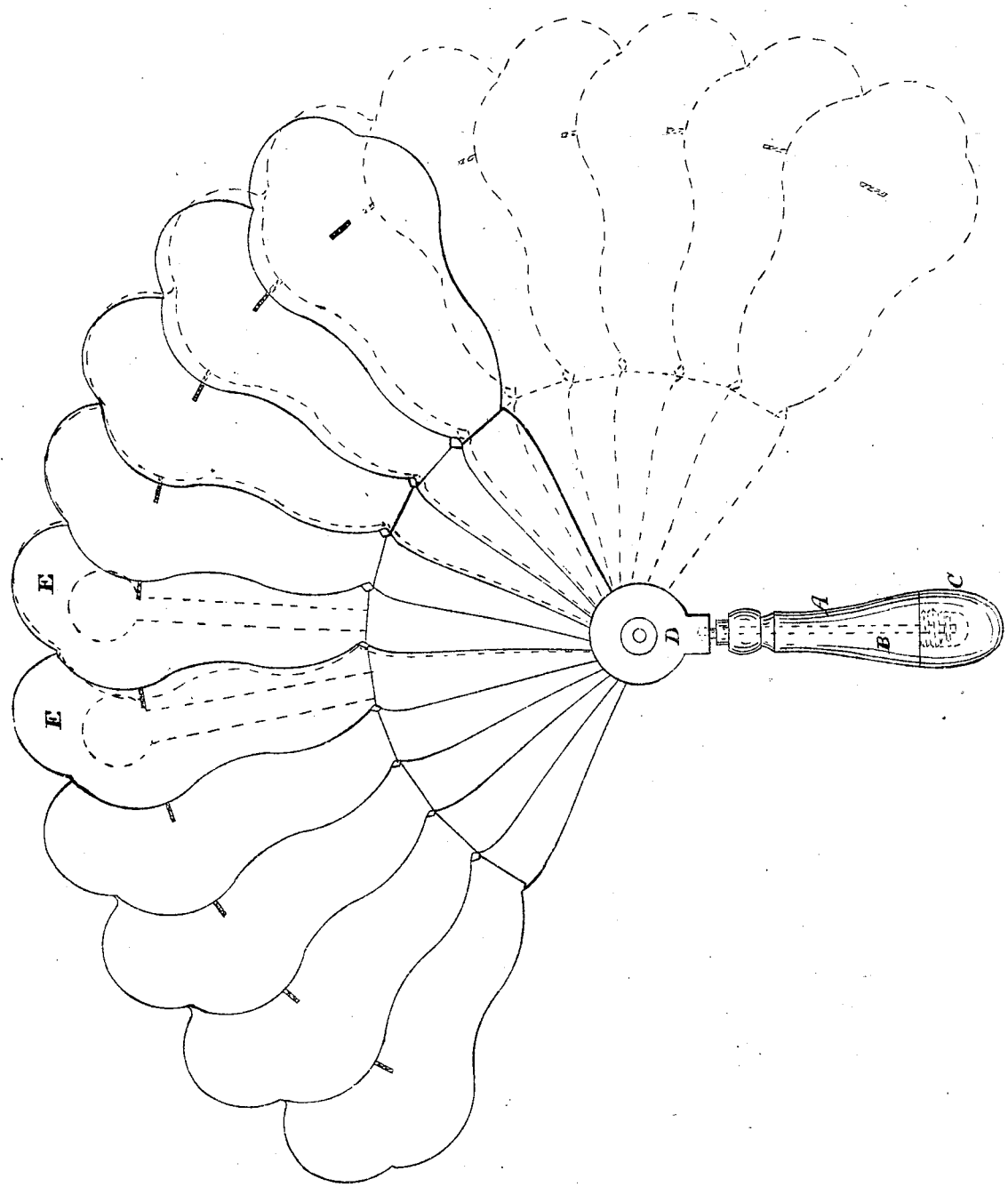

THOMAS WELHAM, OF WASHINGTON, DISTRICT OF COLUMBIA.

IMPROVEMENT IN LADIES' FANS.

Specification forming part of Letters Patent No. 53,714, dated April 3, 1866.

*To all whom it may concern:*

Be it known that I, THOMAS WELHAM, of Washington city, District of Columbia, have invented new and useful Improvements in Ladies' Fans; and I do hereby declare that the following is a full and exact description thereof, reference being had to the accompanying drawing, and to the letters of reference marked thereon, making a part of this specification.

The nature of my invention consists in the construction of a fan that can be used as an upright fan, as commonly used, or as a rotary fan, by means of a swivel-handle.

A represents the handle, in which the pivot B revolves. The pivot does not extend through the whole length of the handle, so that the point might by friction rub the hand, to avoid which I have a cap, C, screwed onto the lower end of handle, and large enough, as a casket or box for perfumery, to contain cotton or any substance saturated with essences or essential oils. The clasp-joint D, to which the ends of the fan-feathers are riveted, revolves upon the pivot B, so that the fan, when open, can be used, as fans usually are, in an upright position, but when set at an angle, as shown by the red lines, it is made to revolve on the swivel-handle, so that it maintains a continual revolving current of air instead of a forward current, as other fans operate. The lower or inner ends of the fan-feathers are rounding, corresponding with the size of the disks, and are compressed by a gum-elastic or spring washer on each side as a packing, so that when the fan is moved to the side to be revolved it will not close by the force of the revolution.

At the front or top ends of two of the middle feathers of the fan I insert a small piece of metal, E, as a weight, to give the fan velocity in its revolution that the resistance of the atmosphere would otherwise impede.

What I claim as my invention, and desire to secure by Letters Patent, is—

1. A fan so constructed in relation to its handle that the fan and the handle may be adjusted in line or at any desired angle, substantially as described.

2. So pivoting said fan as to permit it to revolve upon the handle, whether fixed in line with the handle or set at any angle, all substantially as described.

3. In combination with such adjustable or revolving fan, a casket in the handle thereof, substantially as described.

4. In combination with such adjustable or revolving fan, the weighted extremities of the fan or feathers thereof, substantially as described.

THOS. WELHAM.

Witnesses:
J. FRANKLIN REIGART,
EDM. F. BROWN.